United States Patent [19]

Wolter et al.

[11] Patent Number: 4,504,319

[45] Date of Patent: Mar. 12, 1985

[54] METHOD AND APPARATUS FOR BURNING CEMENT CLINKER

[75] Inventors: Albrecht Wolter, Cologne; Horst Herchenbach, Hennef, both of Fed. Rep. of Germany

[73] Assignee: Klöckner-Humboldt-Deutz AG, Fed. Rep. of Germany

[21] Appl. No.: 554,041

[22] Filed: Nov. 21, 1983

[30] Foreign Application Priority Data

Dec. 4, 1982 [DE] Fed. Rep. of Germany ....... 3244943

[51] Int. Cl.$^3$ ................................................. C04B 7/44
[52] U.S. Cl. .................................... 106/100; 106/103; 432/13; 432/14; 432/106
[58] Field of Search .................. 106/100, 103; 432/13, 432/14, 106

[56] References Cited

U.S. PATENT DOCUMENTS 4,416,622 11/1983 Touborg ............................ 106/100

Primary Examiner—James Poer
Attorney, Agent, or Firm—Hill, Van Santen, Steadman & Simpson

[57] ABSTRACT

A method and apparatus for burning cement clinker from differing mineral base materials. One of the base materials has a relatively high proportion of components which form melt phases at a predetermined temperature and another base material has a relatively slight proportion of such components. The two base materials are separately thermally pretreated. The base material higher in melt phases is at least partially melted after thermal pretreatment and is introduced into a clinker reactor in its molten state together with the thermally pretreated base material which is lower in melt phases and still exists in the solid phase. The mixture is heat treated and finish-burned into clinker in the clinker reactor. The invention also comprehends apparatus for performing the method of the invention.

25 Claims, 13 Drawing Figures

METHOD AND APPARATUS FOR BURNING CEMENT CLINKER

BACKGROUND OF THE INVENTION

1. Field of the Invention

The present invention is in the field of method and apparatus for burning cement clinker from different mineral base materials which after separate heat treatment depending on the nature of the material, are combined for formation of clinker in a clinker reaction zone.

2. Description of the Prior Art

The dry burning method is predominantly employed in the prior art for manufacturing cement, essentially portland cement, for economic reasons, particularly for reasons of heat economy. The preheating of the material is accomplished in a heat exchanger outside of a rotary tubular kiln, and the deacidification which has the relatively greatest amount of heat consumption is also carried out in a separate calciner in most instances. In this method, there is the advantage that the heat transmission to fine grains of particles in suspension with hot gas is very efficient both in the preheating as well as in the calcination stages as a result of which the specific heat consumption in cement burning is considerably reduced as compared with older installations. The sinter roasting in the rotary tubular kiln, however, still requires about 30 to 40% of the overall fuel usage when nearly complete deacidification of the raw meal is achieved in a calciner.

In accordance with the present description, the term "sinter roasting" means the heating of the product from approximately 900° C. following the calcination up to a temperature in the range of incipient alite formation at approximately 1250° C. as well as the range, characterized by the formation of melt phases, of sintering reaction of the lime and silicon components into technical tri-calcium silicate (alite) above 1300° C. The clinker reaction or the "maturing" is considered completed when all but slight residues of free CaO have been consumed by the reaction with $Ca_2SiO_4$ (belite).

A method for burning cement clinker which essentially corresponds to the above noted prior art can make use of a rotary tubular kiln which is preceded by two heat exchange lines operated in parallel, with raw meal being delivered to a heat exchanger which is operated with cooler exhaust gas and clay being delivered to a heat exchanger operated with the kiln exhaust gases. This type of installation is described in DE-LP No. 1,213,337. The division of heat exchange lines prevents carbon dioxide present in relatively high concentration in the kiln exhaust from reacting with free calcium oxide in the raw meal to form calcium carbonate which would result in the fact that additional heat would have to be exerted for the additional deacidification.

A similar improved installation includes a rotary tubular kiln and two preceding, parallel heat exchanger lines wherein the clay component is likewise delivered to the line charged with kiln exhaust and the lime component is delivered to the line charged with hot cooler gas. The temperature is boosted with auxiliary burners in accordance with the heat consumption. Preheated clay together with heated limestone proceed over a conduit for hot cooler air equipped with auxiliary burners and into a heat exchanger preceding the rotary tubular kiln. Both base materials are homogeneously mixed therein and are heated further at the same time.

This known process has the advantage that with an elevated sulfur content in the kiln exhaust gases, the resulting sulfur dioxide is eliminated from the system in the heat exchanger line charged with the argillaceous minerals and can be separated from the gases in a known manner. This type of system is described in DE-OS No. 22 62 213.

The tendency of further developments and improvements has been to further shorten the rotary tubular kiln and, to this end, to transfer the heating of the product in the temperature range between about 900° C. and 1250° C. into a preceding, stationary heating unit. A further goal of these developments is to further reduce the fuel inventory per weight unit of clinker, the energy consumption of the system including the energy consumption of the clinker grinding system, and the capital costs of the system.

Continuing improvement of the so-called "rapid burning" process could make an important contribution to the attainment of this goal if one could succeed in overcoming the difficulties, technical limitation, and problems connected therewith.

It was soon realized that the heating of the product as rapidly as possible could be achieved on the basis of intimate contact between the flame and the product, particularly in the heating phase between deacidification and alite formation in order to improve burning results. This is discussed in the early DE-LP No. 337,312 of May, 1921. A divided rotary tubular kiln was proposed as a possible solution, with a sintering part which rotated more slowly than the kiln for heating product close to the sintering point. The kiln was supposed to rotate at a sufficiently high speed so that the product was lifted close to the apex of the kiln and freely fell through the kiln cross section. Heat transmissions in the convection zone are theoretically significantly higher as a result, lying partially on the order of heat transmissions of the product in suspension. This proposal, however, was never developed because of the substantial amounts of dust arising in the system gas.

A further proposal for implementation of the so-called rapid burning of raw material was disclosed in DL-LP No. 97 409. According to this reference the powdery or agglomerated mixture could be rapidly heated in a fluidized bed in a stationary reactor and could be sintered up to maturing, whereby extremely high heating gradients are achieved in the temperature range between about 1100° and 1350° C. An advantage of this procedure would be a reduction of the maturing time by about 70% with advantages that flow from this, namely, reducing the size of the maturing reactor or increasing its throughput or carrying out the maturing at lower temperatures with a lower fuel inventory. Some of these advantages resulting from extremely high heating gradients are derived from avoiding deactivation of the calcined product.

Although the theoretical bases of this procedure are correct, the proposal was likewise not developed commercially because of difficulties in the stationary heating units. For example, cakings and encrustations can arise when heating the product in a stationary unit even in the temperature interval of 850° to 1250° C. Such encrustations become adhesive due to imbalance at the high temperatures, but are principally due to the secondary components such as KCl, $K_2SO_4$, $CaSO_4$, and the like, which are enriched in the circulation. Such encrustations require an expensive procedure for their removal and deteriorate the process in the final analysis.

If the foregoing problems could be overcome, and limits placed on technical feasibilities thereby caused could be expanded, considerable progress would result. This advantage results from savings of fuel per ton of clinker, savings in energy consumption, reduction of investment volume and, from a reduced requirement for grinding energy, since clinker produced by means of rapid burning is not as highly sintered but turns out to be relatively porous.

With the initially described, presently used standard burning process wherein there is countercurrent flow of burning product and system product, however, a porous clinker is extremely injurious because of the increased dust production inasmuch as dust circulations produce considerable reduction of the system performance and result in an increase of the specific energy consumption.

SUMMARY OF THE INVENTION

The present invention seeks to overcome the difficulties and technical limitations described above, to provide for rapid burning of cement clinker and to exploit the natural properties of the product employed in order to avoid operating malfunctions and encrustations so as to provide a problem-free rapid clinker burning with economical means.

In accordance with the present invention, we provide a method for burning cement clinker from different mineral base materials which undergo separate dressing and separate thermal pretreatments and are combined for clinker reaction and finish-burning. One of the base materials has a relatively high proportion of components forming melt phases at a predetermined temperature and the other base material has relatively slight components forming melt phases at the predetermined temperature. In keeping with the present invention, the base material having the higher proportion of components forming melt phases is at least partially melted after thermal pretreatment and is introduced into the clinker reactor in its at least partially molten state together with the other base material which is still in its solid state. The two base materials are mixed with each other in the clinker reactor and the mixture is heat treated and/or finish-burned into clinker.

For purposes of better understanding, the definition of the terms employed will now be undertaken. The "raw materials" are minerals which are mined from the earth in surface operations or in underground operations and which are dressed under given conditions by means of preliminary breaking, washing, grading, and the like. The "base materials" are material mixtures or materials which are required for the manufacture of a specific grade of cement and which are supplied to the installation for processing. The "components" are chemical components, for example, $SiO_2$, $CaCO_3$, $CaO$, $Al_2O_3$, $Fe_2O_3$, and the like, which are contained in certain proportions in the base materials or in the raw materials.

In component mixtures such as cement base materials, a temperature interval referred to as the "melt interval" over which fusion occurs is observed rather than providing a sharply defined melting point. In the case of cement burning, specifically for traditional burning of portland cement, the first melt formed when heating is always high in $Fe_2O_3$ and $Al_2O_3$ but low in $SiO_2$. At temperatures above approximately 1300° C., these components are already chemically bonded to CaO. The phases $Ca_3Al_2O_6$, $Ca_{12}Al_{14}O_{33}$, $Ca_2(Al, Fe)_2O_5$, and more rarely, $Ca_2Fe_2O_5$ present are converted into molten form in a temperature range from about 1300 through 1400° C. These components are considered meltable with relative ease.

The melting of the silicate phases $Ca_3SiO_5$ and $Ca_2SiO_4$ requires temperatures up to a maximum of about 2000° C., i.e., it occurs at higher temperatures and covers a temperature range that is about 4 to 6 times wider than that of the aluminate-ferrite phases. The high-lime content silicate phases can therefore be considered relatively difficult to melt. Mixtures high in lime continue to contain solid CaO even at temperatures above 2000° C. The melt formation in mixtures particularly low in lime, however, can already begin at approximately 900 to 1300° C. whereby a series of lower content lime compounds can also appear as crystallized equilibrium phases which need not be discussed with more particularity here.

The component composition is determined on the basis of the desired clinker composition. Since the principal components that form melt phases, such as $Al_2O_3$ and $Fe_2O_3$ are introduced with the argillaceous minerals usually as iron ore or ferruginous aluminosilicates, the base material that includes predominating amounts of these components is "higher in melt phases" and another base material which contains these components only to a significantly lesser degree or not at all is "lower in melt phases" but may be higher, for example, in $CaCO_3$ and, secondarily, $MgCO_3$.

A series of advantages results from the present invention. As a result of the matching of thermal treatment for the differing base materials, creation and concentration of injurious substances due to the presence of sulfur dioxide, carbon dioxide, alkali oxides, alkali chlorides, and sulfates, is largely avoided or localized in stationary system parts or they are segregated into units which can be controlled by means of known measures such as bypasses or dilution or temperature matching. As a result, burning disruptions due to the existence of excessive accretions are avoided as a result of separating the substances based upon their content of components forming melt phases. The material lower in melt phases does not have a tendency to form cakings even upon stationary heating. On the other hand, a material higher in melt phases is present as a flux that can be managed in the usual manner. Thus, a largely problem-free execution of rapid burning using the above-mentioned advantages is attained by means of a thermal treatment matched to the natural properties of the base materials. A reduction of capital and operating costs is also achieved as a result of conducting the process steps in stationary units which are more favorable in terms of heat economy, coupled with a shortening of the rotary tubular kiln employed as a clinker reactor. The rotary tubular kiln can be kept extremely short because it serves only for maturing and can be filled with a relatively high charge level in the product bed because the heating zone is lacking. Another example is the ability to shorten the conduits such as the tertiary air conduit resulting in a considerable cost reduction.

Finally, alite formation is made possible at a relatively low temperature level due to the rapid burning, thereby saving fuel and a reduction of the cooler capacity becomes possible as a further advantage with its construction and operating costs reduced. Grinding energy is also saved because the clinker is more porous as a result of the process of the invention than in conventional burning.

Depending upon the carbonate content of the base materials, both the base material lower in melt phases as well as the base material higher in melt phases are at least partially or completely calcined before introduction into the clinker reactor.

In contrast to standard methods, the mixing of the base materials or of the components is only accomplished in the clinker reactor, the present invention essentially provides that the thermally pretreated base materials are introduced into the clinker reactor upon simultaneous formation of a mixture. The melt together with highly heated, mealy base material low in melt phases can be advantageously introduced into the clinker reactor in the area of a flame upon atomization and turbulence and through the flame under certain conditions. It is thereby further advantageous that the heat treatment or maturing of the product bed is carried out under intense agitation or mixing in the clinker reactor. The intense motion of the mix in the rotary tubular kiln can be achieved, for example, with a relatively high charge that clearly exceeds the standard measure of charge with conventional operation, using a rotational speed which is only slightly below the critical speed so that intense forces in motion act on the product bed. The critical speed is that at which the product is no longer circulated as a result of centrifugal force but rotates together with the clyindrical body. The base materials are thereby brought into intimate contact with one another and the mixture is homogenized.

In accordance with the present invention, the raw materials with differing contents of components forming melt phases can be blended collectively with regard to their components. These base materials having predetermined amounts of components forming melt phases are rapidly heated in their separate pretreatment stages in the temperature span between the end of deacidification (approximately 900° C.) and the beginning of alite formation (approximately 1250° C.) either in a stationary heating unit or by means of temperature equalization between the base materials upon introduction into the clinker reactor.

The term "melting" as used in this specification is to be understood in the sense that at least 30 weight percent of the material is converted into the molten state when melting the base material higher in melt phases so that at least a partially molten product stream having the flow properties of a melt exists.

The melting preferably takes place in the form of a suspension of fine grained base material in a flame, for example, in a melting cyclone or a melting stack or in a hearth. Any form of fuel, solid, liquid or gaseous, can be employed for this purpose. Under some conditions, it is necessary that the partially molten product stream be superheated so that its molten part is increased in order to achieve a temperature equilibrium at the required level of approximately 1300° through 1400° C. in the mixture of the thermally pretreated base materials in the clinker reactor. A better ability to mix is an advantage occurring when more molten material exists in the mixture. Materials higher in melt phases which can be used to advantage in the present invention in molten or partially molten form are molten slags from a smelting process, particularly blast furnace slags. A reduction in fuel consumption is achieved because molten slags already have a considerable thermal potential and the lime contained therein no longer requires any heat for deacidification.

It may be necessary to add additional lime to the base material higher in melt phases up to a CaO content in the stability range of $Ca_2SiO_4$ (belite) either by means of admixture at the time of grinding or by adding a high lime raw meal or hot meal to the slag or other base material high in melt phases so that the crystallization out of phases lower in lime which is unfavorable for alite formation is avoided.

In the method of the present invention, the component higher in melt phases can advantageously have a low $Al_2O_3/Fe_2O_3$ mass ratio typically less than 1.7 whereby lower melting temperatures and a reduced melt interval for the different base materials is achieved. The method is therefore particularly well suited for the manufacture of low tricalcium aluminate portland cements which have an increased sulfate resistance. It may thus be expedient or necessary when using blast furnace slag to enrich the slag with $Al_2O_3$ or $Fe_2O_3$ carriers.

One of the advantages of the present invention is that the thermal pretreatment steps of the base materials such as preheating, calcining, heating as well as melting can be carried out in stationary units so that only the clinker reaction is carried out in a rotating reactor. The rotary tubular kiln or rotating plate reactor used as the clinker reactor can be operated in concurrent flow, in countercurrent flow or in some conditions, on a combined flow principle.

The apparatus of the present invention comprises separate preheating units in a parallel arrangement for the two types of base materials as well as a clinker reactor with a subsequent cooler. In accordance with the present invention, the preheating unit for the base material higher in melt phases includes a melting reactor and the rotary tubular kiln has both a feed means for a partially molten product stream as well as a feed means for the heated, mealy product.

BRIEF DESCRIPTION OF THE DRAWINGS

The invention and its advantages are described in greater detail with reference to sample embodiments shown in the drawings in which.

DESCRIPTION OF THE PREFERRED EMBODIMENTS

Figure 1:
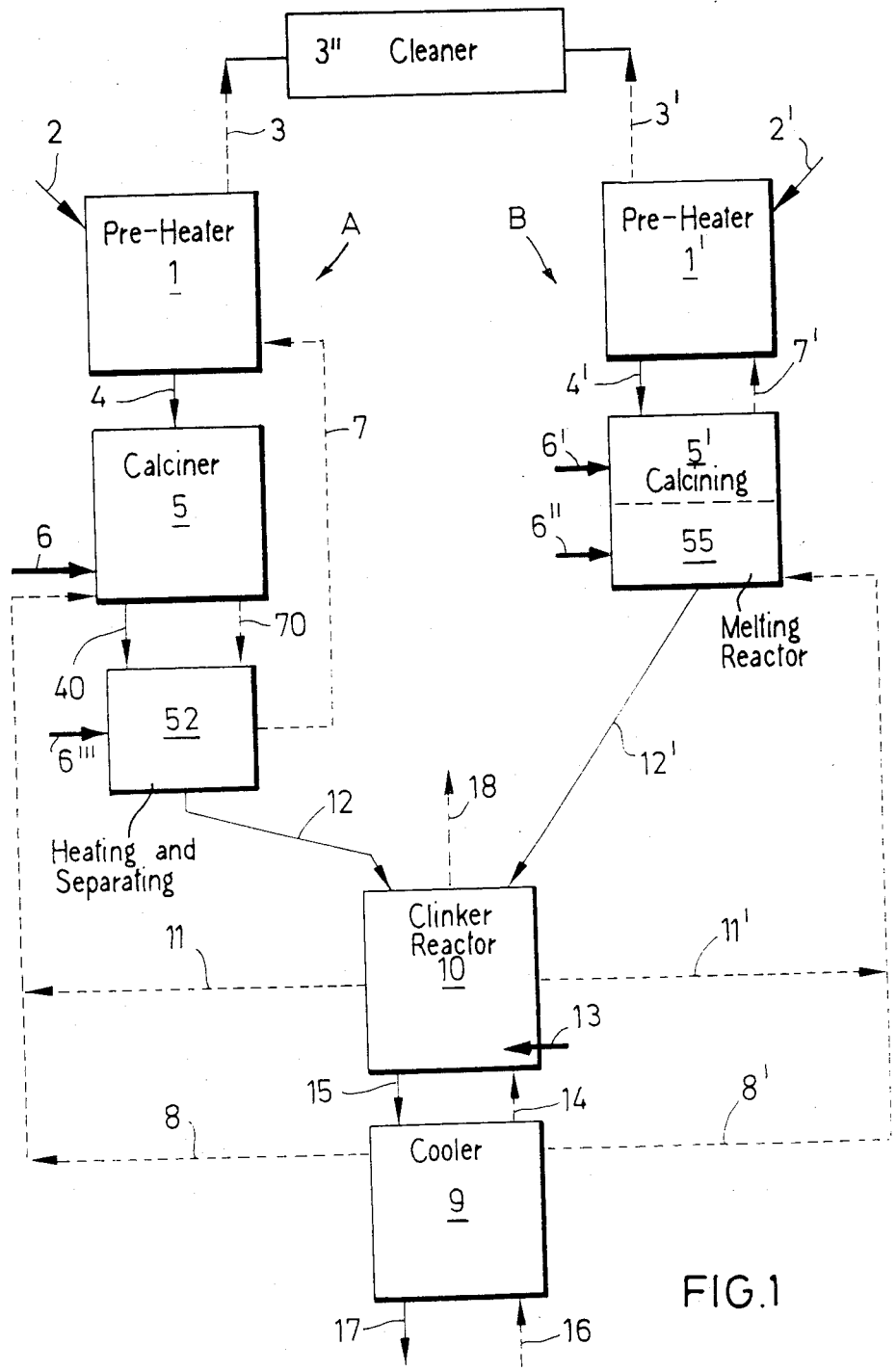
FIG. 1 is a flow diagram of a clinker burning installation employed where there are larger amounts of material lower in melt phases.
Figure 2:
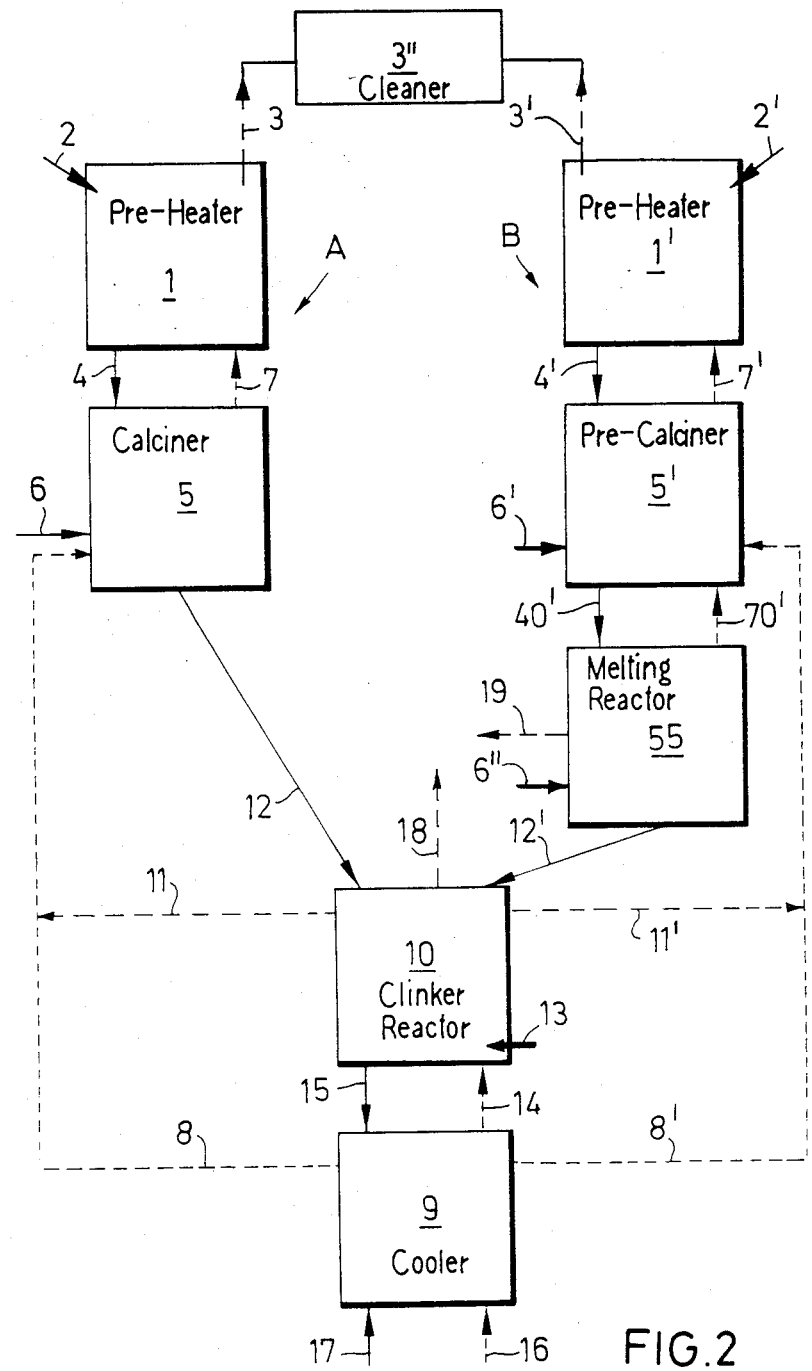
FIG. 2 is another flow diagram of a clinker burning installation where the two types of base materials are in substantially equal amounts.
Figure 3:
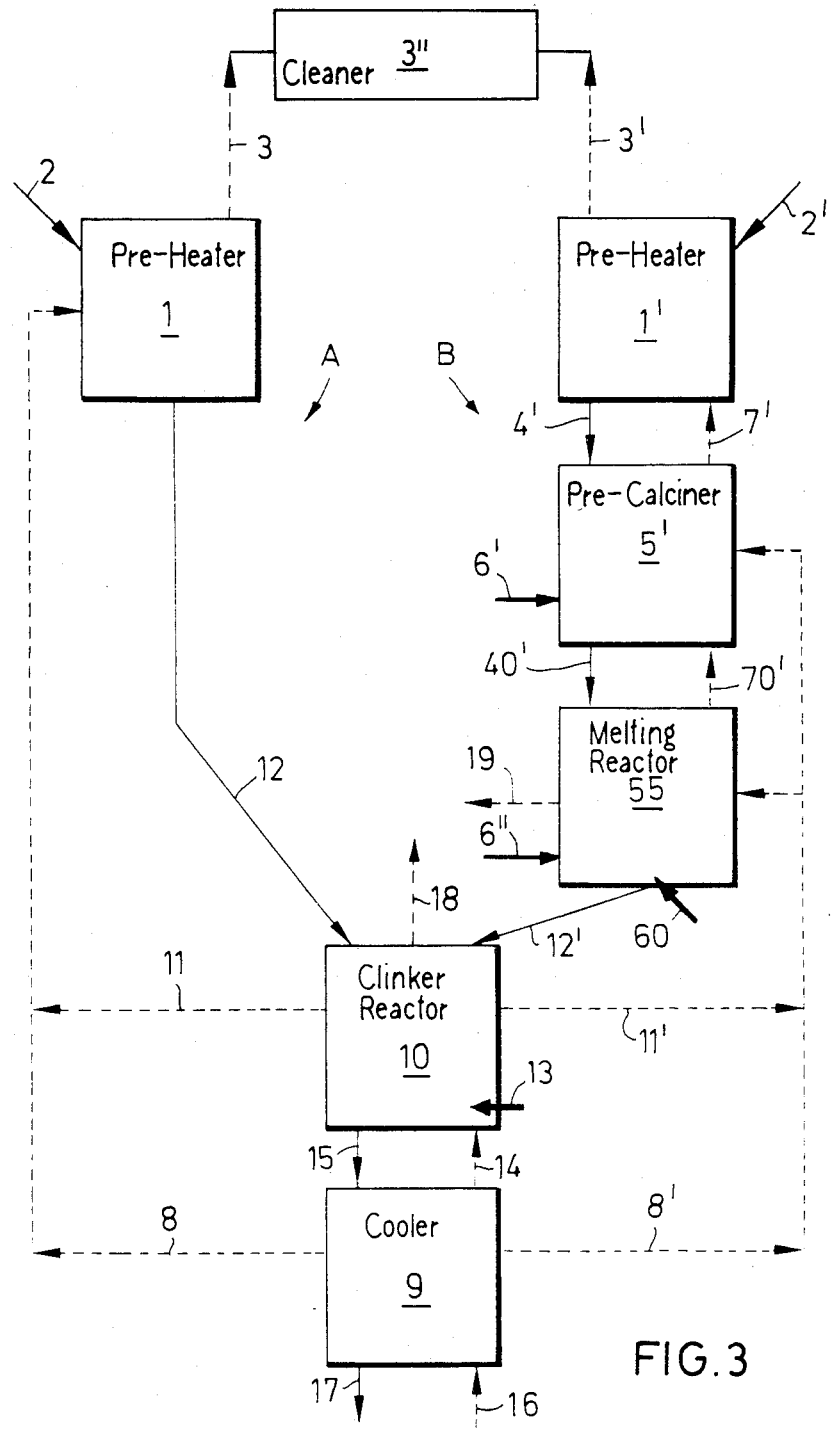
FIG. 3 is another flow diagram of a clinker burning installation where there is a larger amount of material higher in melt phases.

The schematic illustrations in FIGS. 1 through 3 essentially differ on the basis of the preheating systems employed for the two stationary heat treatment units.

Figure 5:
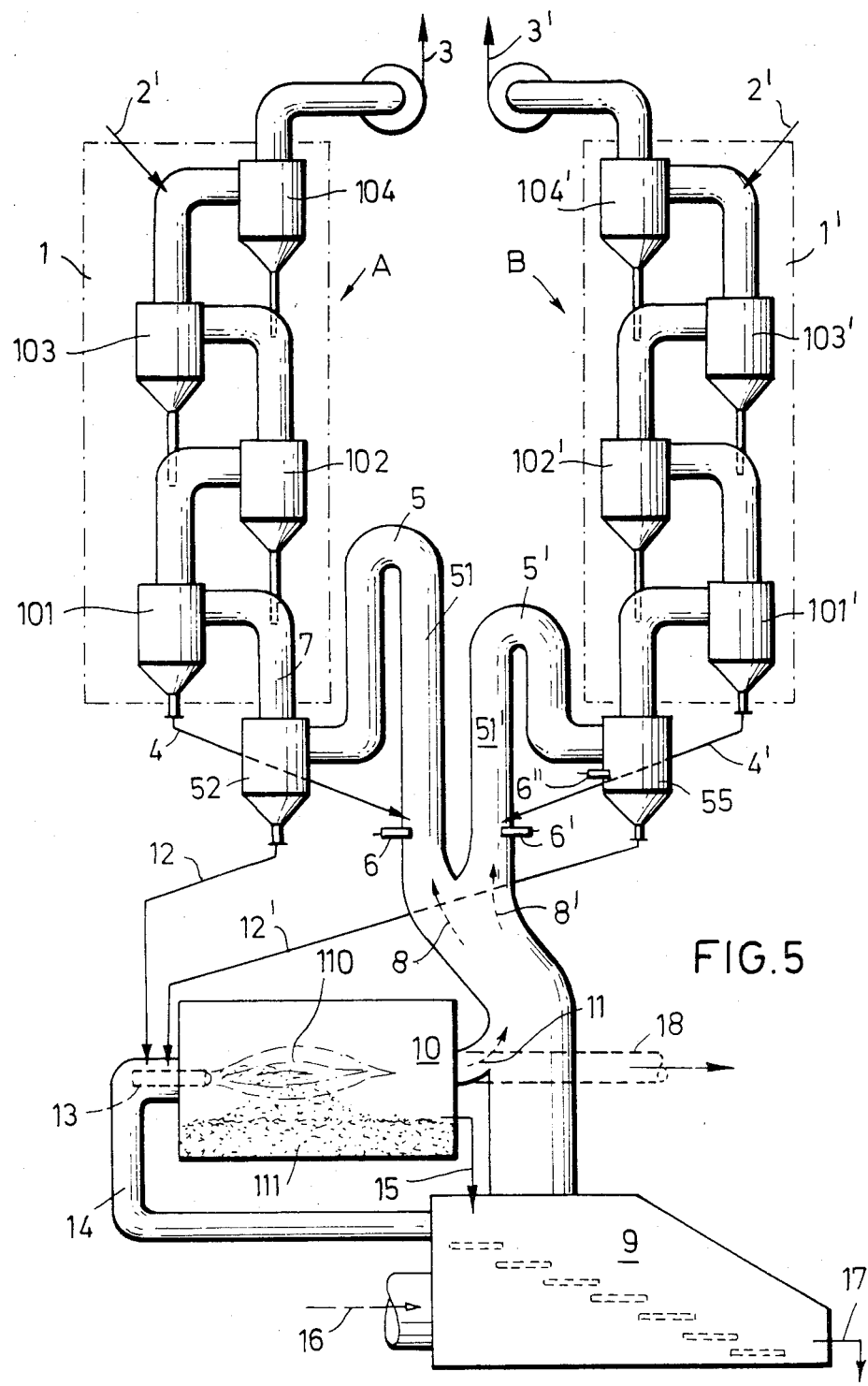
FIGS. 5 through 9 are side elevational views of burning systems used for varying ratios of base materials.

The system in FIG. 1 includes parallel preheater lines A and B. The line A includes a preheater 1 which consists of a conventional chain of series-connected preheating cyclones, illustrated more particularly in FIGS. 5 through 9. Raw meal is introduced as indicated by the arrow 2 into the preheater 1 and exhaust gas is shown being vented by the arrow 3. Raw meal at a temperature of about 650° C. is withdrawn from the preheater 1 as illustrated by the arrow 4 and is directed into a calciner 5. This calciner, as shown in FIG. 5, may be a vertical reaction stack with an ascending and descending branch. Other known embodiments of calciners can also be used such as pot-like reactors or cyclones.

Depending upon the ratio of raw meal to fuel, a partial or complete deacidification of the product occurs in the calciner 5. The fuel is directed into the calciner 5 by means of a line indicated by arrow 6 or at a plurality of points under some conditions. Hot cooler exhaust is introduced into the calciner 5 by means of a conduit 8 as combustion air. The hot cooler exhaust in the conduit 8 can also be mixed with fuel gas from the clinker reactor 10 as indicated by the arrow 11. The raw meal introduced as indicated at 2 contains the base material lower in melt phases and calcium carbonate as the predominant component. A largely or completely deacidified product is withdrawn from the calciner as indicated by the arrow 40 and is introduced into a heating and separating unit 52 together with a gas stream as indicated by the arrow 70. The solid material after separation of gas and product is delivered into a clinker reactor 10 by means of a conduit 12 whereas hot gas is returned into the preheater 1 by means of a conduit 7. Fuel is supplied to the heating and separating unit 52 as indicated by the arrow 6‴.

The preheater line B likewise has a preheater 1′ of fundamentally the same structure as the preheater 1 of line A. It can, however, differ from the preheater 1 in structural volume, or capacity and thus in the throughput of the quantitative flow of gas, product and heat. Raw meal is supplied to the preheater as indicated by the arrow 2′, the raw meal containing components higher in melt phases such as clay, laterite, bauxite or iron ore, marl, argillaceous marl, lignite fly-ash and chemically similar substances.

The preheated product is introduced as shown by arrow 4′ from the preheater 1′ into a calcining and melting reactor 5′, 55 whose structure corresponds to the calcining and melting reactor 5′, 51′ and 55 illustrated in FIG. 5. The product 4′ enters from the preheater 1′ at approximately 650 through 700° C. and is calcined and subsequently melted therein. With a proportion of 35 weight % melt, there is produced a partially molten product stream which exhibits fluid behavior. Before or upon discharge from the melting reactor 55, it may be heated further so that its molten component is thereby increased by means of further energy supplied as indicated by the arrow 6″ where fuel via a flame or an electric heating device provides the additional heat.

The molten product stream is supplied to the clinker reactor 10 by means of a conduit 12′ and is mixed with the hot meal from the conduit 12 upon entry into the clinker reactor 10. The calcining and melting reactor 5′, 55 is supplied with fuel at a location 6″ and with oxygen by means of hot cooler air from the cooler unit 9 to a conduit 8′. The hot cooler exhaust can have a portion of exhaust gas from the clinker reactor 10 added to it by means of a conduit 11′. Hot gas from the calcining and melting reactor 5′, 55 is introduced into the preheater 1′ through a conduit 7′ and then transfers its available heat content to the feed product entering at 2′.

The clinker reactor 10 is, for example, a relatively short rotary tubular kiln whose manner of operation and incorporation into the system will be explained in detail with reference to FIGS. 4a through 4d as well as FIGS. 5 through 9.

The system layout according to FIG. 1 is suited for an unequal quantitative distribution of the base materials wherein the base material lower in melt phases predominates in terms of amount relative to the base material higher in melt phases.

In FIG. 2, there is shown a system which can be used for a nearly balanced, equal tonnage ratio of the base materials. In FIG. 2, there is provided a different configuration of the preheater line B, differing from the system of FIG. 1 in that a separate precalciner 5′ is provided between the preheater 1′ and the melting reactor 55. This is required because the base material higher in melt phases has a CaO content in the stability range of $Ca_2SiO_4$ (belite) and accordingly contains a calcium carbonate component that must be deacidified.

FIG. 3 illustrates a cement-burning system for base materials wherein the base material higher in melt phases significantly predominates. A calcining reactor is omitted in the preheater line A because the heat content or excess heat of the partially or completely molten product steam indicated at arrow 12′ from the preheater line B suffices to calcine the relatively slight amount of the lower melt phase, high-lime product from line A upon mixing for maturing. Otherwise, the preheater line B corresponds to that of FIG. 2 whereby the size and capacity conditions are matched to the actual quantitative and thermal stresses based upon the relative amounts of base material.

In most instances, heat can be supplied to the clinker reactor 10 in the systems shown in FIGS. 1 through 3 by means of a burner 13 and hot cooler exhaust air is combined with the fuel as shown by arrow 14. Finish-burned clinker is introduced from the clinker or maturing reactor 10 into the cooler unit 9 as shown by the arrow 15. Air is conducted through the cooler unit 9 as shown by arrow 16 and is highly heated by direct heat exchange with the clinker fill when the fill cools. Clinker in a cooled condition is discharged as shown by arrow 17.

A partial gas withdrawal by means of a bypass 18 can be used in case a concentration of harmful substances exists in the gas of the clinker reactor 10. If the concentrations of harmful substances occur at other locations, then gas can be withdrawn by means of a bypass 19 from the melting reactor 55.

Exhaust gas from the preheater lines A and B in the systems according to FIGS. 1 through 3 is separately withdrawn as indicated by arrows 3 and 3′ by means of induced draft exhausters. Separate extraction is advantageous and meaningful because the preheater line B may contain a relatively high concentration of sulfur dioxide when using high sulfur fuel for which reason the exhaust gases can be after-treated with means such as a gas cleaner 3″. Exhaust gas cleaning is a technically well-known procedure and is not described in further detail here.

FIGS. 4a through 4d illustrate clinker reactors in purely schematic fashion for illustrating different operating conditions, for example, concurrent flow, countercurrent flow, and combined flow systems.

Figure 4A:
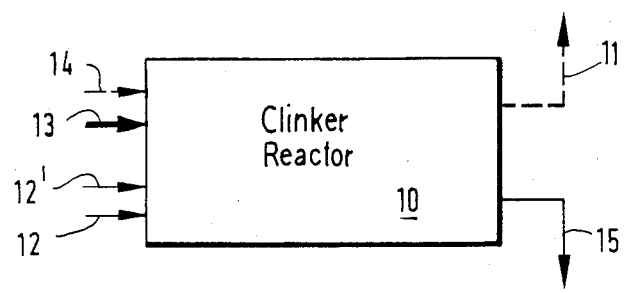
FIGS. 4a through 4d illustrate schematically clinker reactors which are equipped for operation in concurrent flow (FIG. 4a), in countercurrent flow (FIG. 4b), as well as with a combined flow system (FIGS. 4c and 4d)

FIG. 4a illustrates a concurrent mode whereby secondary air is introduced as indicated by the arrow 14, fuel by means of arrow 13, partially molten base material by means of arrow 12', and hot meal by arrow 12. These materials are introduced at one side of the rotary tubular kiln 10 and are preferably intimately mixed upon introduction. Exhaust gas is withdrawn as shown by arrow 11 as well as clinker as shown by arrow 15 from the opposite end face of the rotary tubular kiln 10. Identical reference numerals as used in FIGS. 1 through 3 have been employed in FIGS. 4a through 4d for the corresponding substances and units.

Figure 4B:
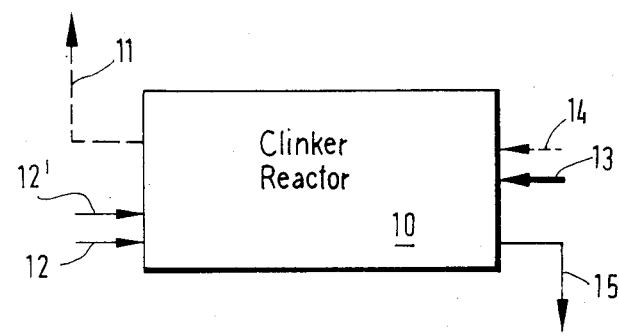

In FIG. 4b, clinker reactor 10 is operated in countercurrent flow, so the melt indicated by arrow 12' and the hot meal as indicated by arrow 12 are conducted in a direction opposite to that of the fuel indicated by arrow 13, the secondary air indicated by arrow 14 and the exhaust gas indicated by arrow 11.

Figure 4C:
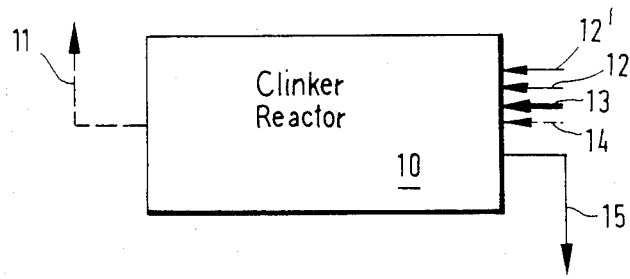

A combined flow system is shown illustrated in FIG. 4c. Melt as indicated by arrow 12' and hot meal as indicated by arrow 12 as well as fuel (arrow 13) and secondary air (arrow 14) are supplied to the clinker reactor 10 in the same direction and exhaust gas 11 is discharged at the other end of the clinker reactor in a continuation of this direction, whereas the clinker is discharged as indicated by arrow 14 after traversing the reactor 10 in the opposite direction so that it is discharged at the intake side of the reactants. The rotary tubular kiln, accordingly, has a slope in the direction of the clinker discharge line 15.

Figure 4D:
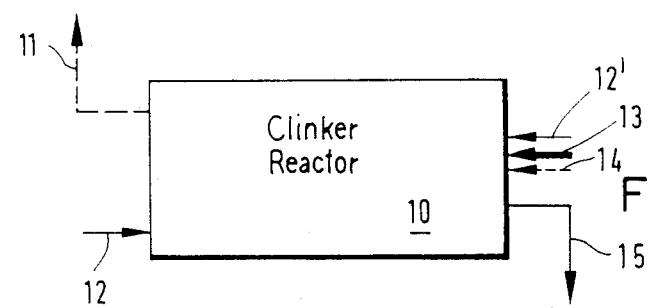

FIG. 4d shows a modification of this layout whereby hot meal as indicated by arrow 12 is introduced at the exhaust gas exit side.

In keeping with the mode shown in FIG. 4a, the clinker reactor of FIG. 5 is operated in concurrent flow. The system has two preheater lines A and B. Each of the lines comprises four series-connected cyclone stages in line A, namely 101, 102, 103 and 104, and in the preheater line B, respectively, 101', 102', 103' and 104'. The cyclone stages which belong together are indicated by a dot-dash line which forms the overall preheater units 1 and 1', respectively. The precalciner 5 is associated with the line A in the flow direction of the product stream with the conduit 4 and follows the preheater unit 1. The precalciner comprises a reaction stack 51 as well as feed means 6 for the fuel. Hot cooler air is introduced from the cooler 9 into the reaction stack 51 through the secondary air shaft 8 and is mixed with preheated raw meal from the conduit 4 in the area of the fuel feed point 6. The resultant mixture of fuel and preheated, carbonate-containing raw meal is heated to approximately 900° C., the calcination temperature, in the reaction stack 51 of the calciner 5, is deacidified in the endothermic process, and at approximately 900° C. is separated from the gas stream in the following separator 52. It is then introduced into the clinker reactor 10 through the conduit 12 as a calcined product, and hot gas is returned into the raw meal preheater 1 by means of the conduit 7. Mealy base material high in melt phases is introduced from the preheater line B in the suspension-type preheater 1' having cyclone stages 101', 102', 103', and 104' into the precalciner 5', 51' through the conduit 4'. The lime component contained in the base material is thus largely deacidified. Fuel is supplied to the precalciner 5', 51', at a fuel inlet 6' and hot secondary air as indicated by arrow 8' is also supplied and intimately mixed in the reaction stack 51' with the preheated product. Carbon dioxide is expelled in the temperature range between approximately 650° C. and 950° C. Calcined product at this temperature is introduced into the melting reactor 55 and is melted to such a degree upon addition of fuel at the fuel inlet 6'' that a partially molten product stream arises, containing at least 30 through 35 weight % molten phase and thus exhibits rheological properties. The molten product in the product stream is introduced from the melting reactor 55' into the clinker reactor 10 through the conduit 12'. The thermally pretreated base materials consisting of a highly heated, completely deacidified hot meal in the conduit 12 and a molten product stream in the conduit 12' are swirled therein in a flame 110 with simultaneous, intimate mixing of fuel entering at an inlet 13 and hot cooler gas in the conduit 14 are homogeneously mixed with one another in the product bed 111 due to the rotational motion of the clinker reactor 10. The mixture is thus matured or sinter-burned into clinker at temperatures of approximately 1300 through 1400° C. resulting in alite formation. As shown by the arrow 15, clinker is discharged into the cooler 9 and is cooled to a final product discharged through a line 17 upon heat exchange with cold cooler air entering as indicated at line 16 whereby the cooler air is heated to approximately 900° C. and is distributed through the conduits 8, 8' to the individual fuel injection points 6, 6', 6'' and 13 in the system.

Exhaust gas from the clinker reactor 10 is introduced either partially or completely into the hot cooler exhaust indicated by arrows 8, 8' and is also partly eliminated by means of the bypass 18 in order to reduce concentrations of harmful substances.

Figure 6:
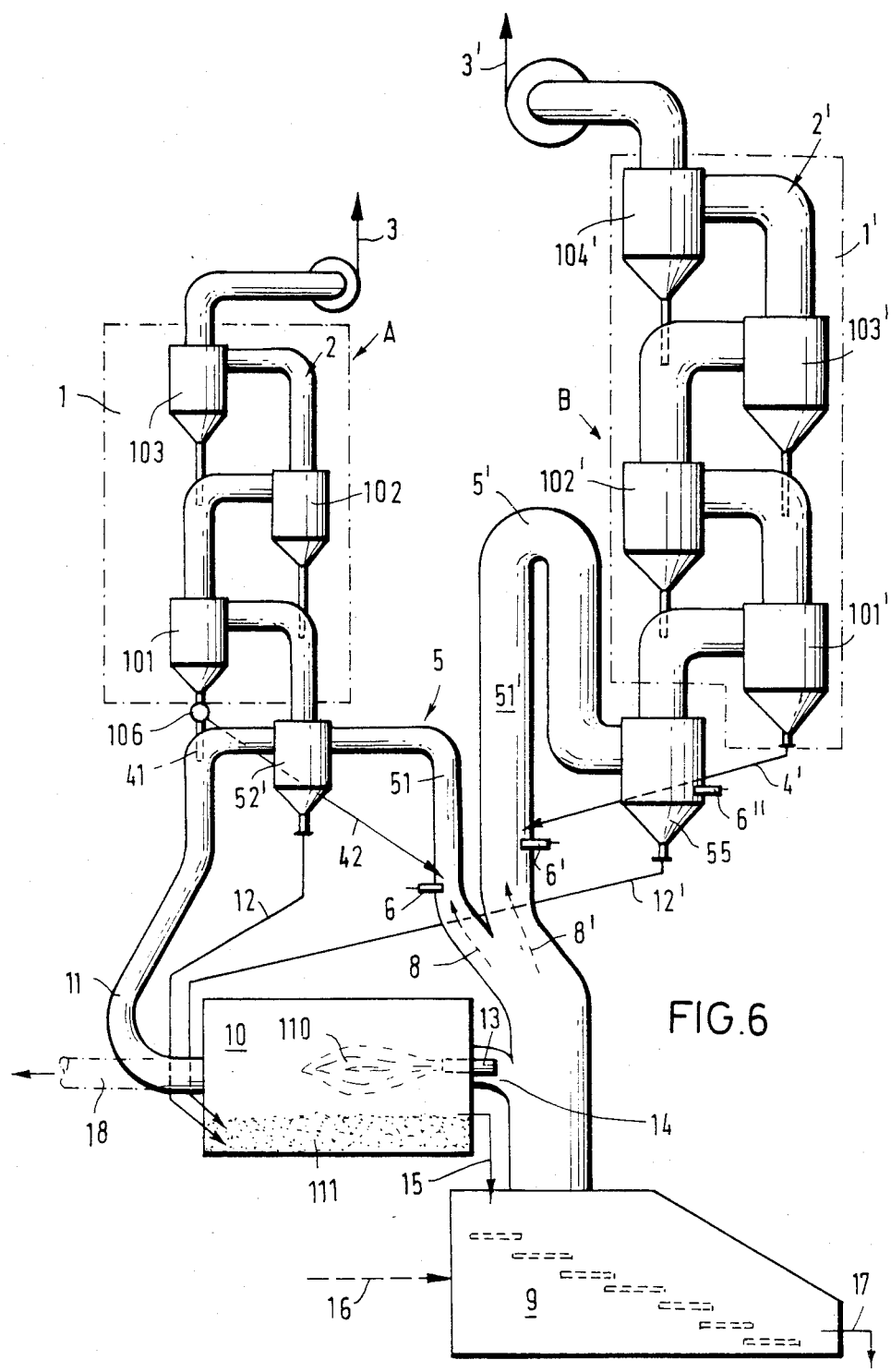

In FIG. 6, the preheater line A has a preheater unit 1 with three cyclone stages 101, 102 and 103. Preheated raw meal is divided into two streams by a divider 106. One of the streams is supplied to the precalciner 5 through a conduit 42. The precalciner comprises the reaction stack 51 with a fuel feed means 6. It further comprises a cyclone 52' equipped as an afterheater and separator. An exhaust gas is supplied thereto from the clinker reactor 10 at a temperature of approximately 1400° C. through the conduit 11 into which the conduit 41 for preheated raw meal also discharges. The relative amounts of raw meal and gas is such that upon complete deacidification, a mixing temperature on the order of about 900° C. occurs and the deacidified meal is introduced at this temperature through the conduit 12 into a rotary kiln 10 which acts as the maturing reactor. A partially molten product stream from the melting cyclone 55 of the heater line B is also introduced through the conduit 12' into the rotary tubular kiln 10. The two product streams are mixed with each other upon introduction and, upon further homogenization, form an intimate mixture in the product bed 111.

Finish-burned clinker is discharged into the cooler 9 as shown by the arrow 15 upon completion of the burning reaction. Hot cooler exhaust is supplied to the system in countercurrent flow to the clinker by means of conduits 8, 8' and a branched amount of cooler air is directly supplied to the burner 13 of the clinker reactor 10 by means of a branch line 14. The pressure and flow conditions in the system are conventional in the prior art and are not described more completely here.

The design of the preheater line B is FIG. 6 is essentially identical to that in FIG. 5 in terms of disposition of the units and a further description is therefore not necessary. Identical units or component parts are referenced with the same reference numerals in FIGS. 5 and 6.

The installation shown in FIG. 6 is advantageously suited for a base material which has a predominant amount of components higher in melt phases. The different size relationships shown in the drawing were selected in order to clearly show that the quantitative flows of product and gas are expressed in matched structural volumes of the system parts.

Figure 7:
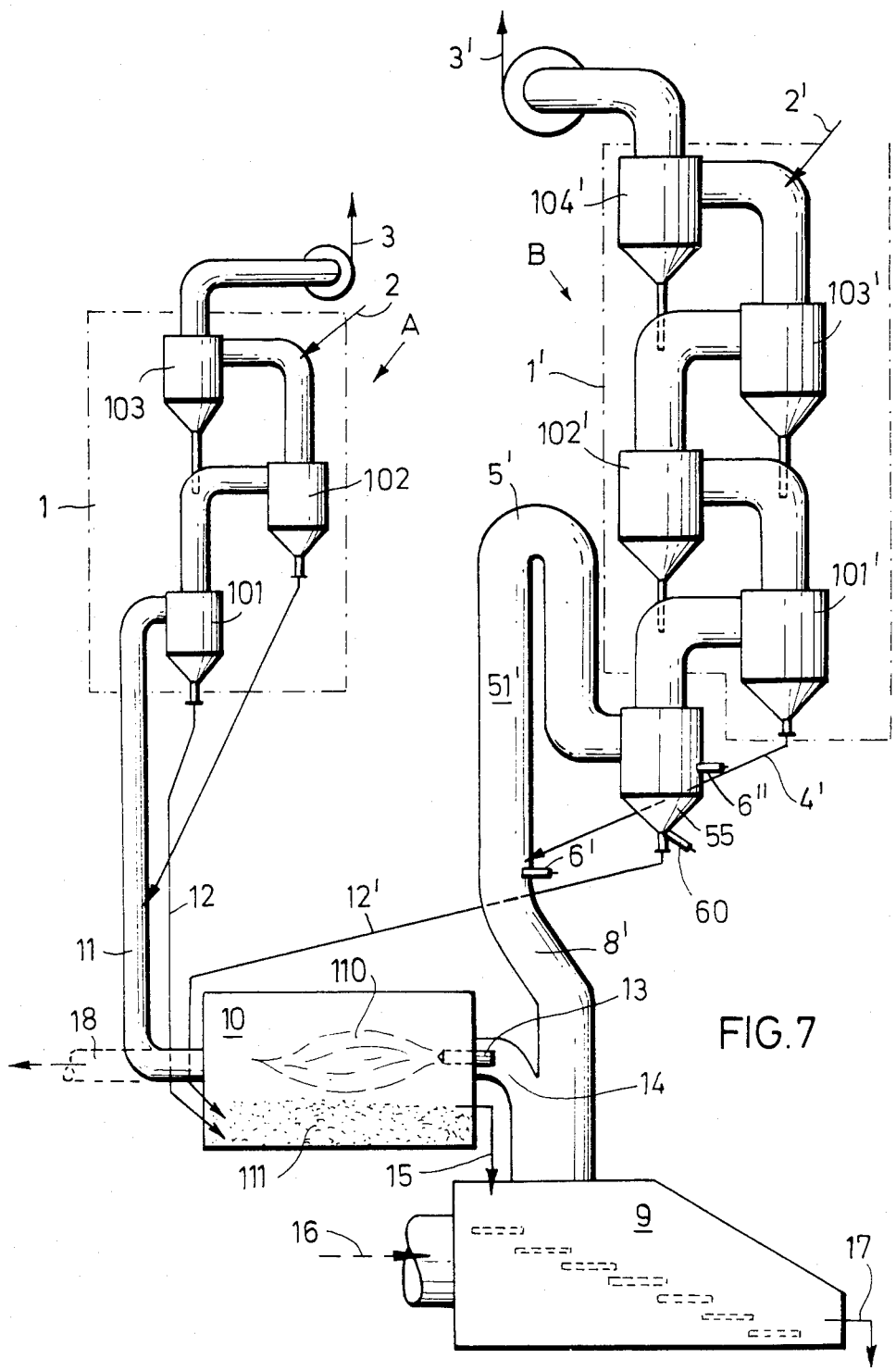

The cement clinker burner installation in FIG. 7 differs from the installation in FIG. 6 in that a preheater unit 1 but no precalciner is provided in the preheater line A. This type of system is used where the quantitative ratio of base materials having components lower in melt phases is present in a substantially lower amount than material having components higher in melt phases. Accordingly, the relative slight amount of carbonate in the preheated raw meal of the preheater line A can be combined with the significantly greater amounts of highly heated base material higher in melt phases from the preheater line B, being combined in the clinker reactor 10 and thereby deacidified. For this reason, the melting reactor 55 to which fuel is supplied at the fuel inlet 6" is equipped with a further inlet means 60 for supplying energy by means of which the melt can be further heated. The molten product stream thus produced is delivered through the conduit 12' at, for example, a temperature of approximately 1300° C. and is combined and mixed in the clinker reactor 10 with preheated raw meal from the preheater 1 which contains calcium carbonate. The quantitative and thermal streams are thus dimensioned so that a heat equilibrium at a temperature level of at least approximately 1250° C. occurs in the mixture upon entry of the two product streams into the clinker reactor 10. The layout of installation schematically illustrated in FIG. 7 corresponds to that schematically shown in FIG. 3.

Figure 8:
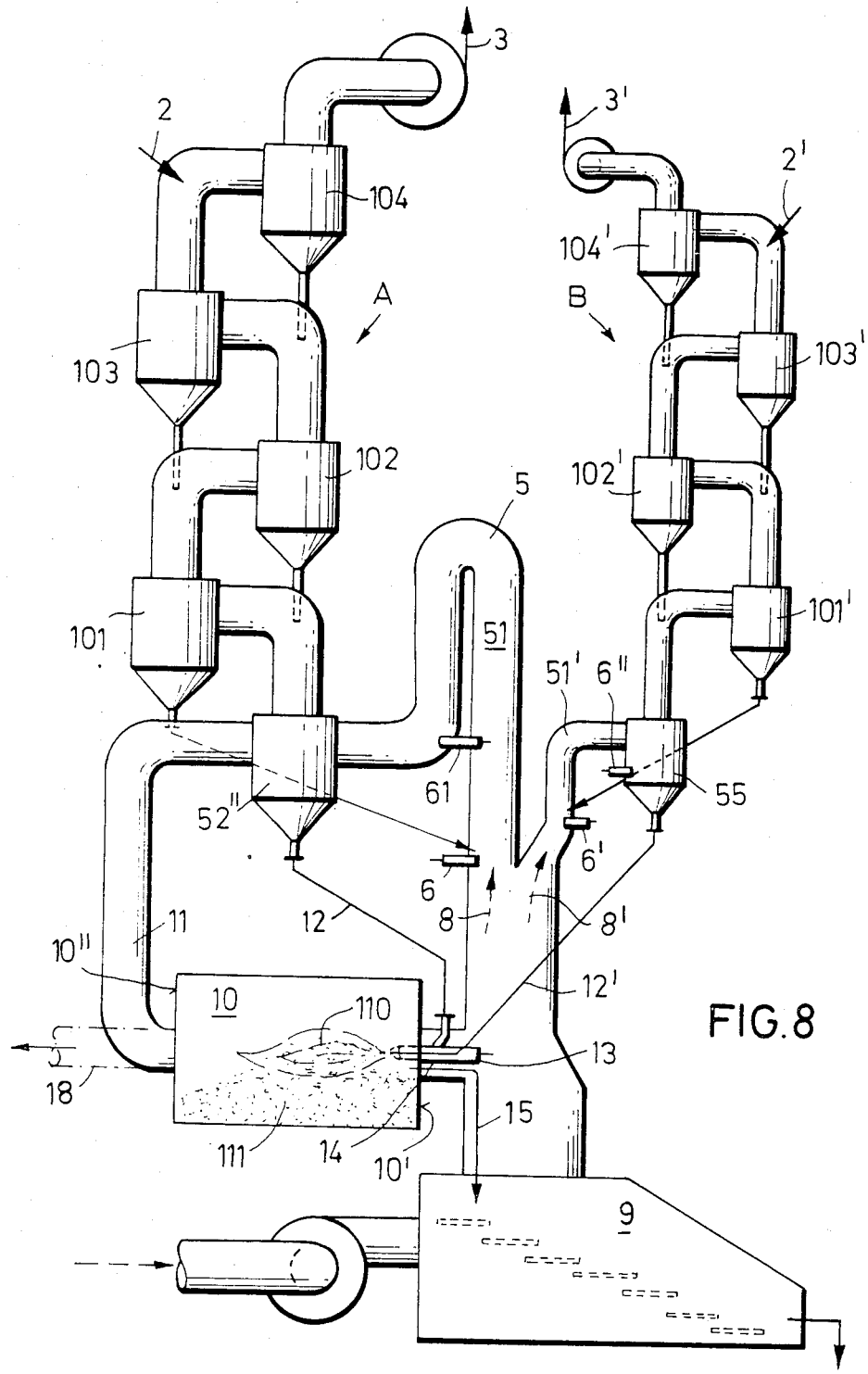

With the burning installation of FIG. 8, the clinker reactor 10 is operated corresponding to the mode illustrated in FIG. 4c. It involves a combined flow principle wherein melt in the conduit 12' and hot meal in the conduit 12 are mixed with fuel entering at an inlet 13 and secondary air at an inlet 14 all of which are delivered to one end face 10' of the clinker reactor. The clinker itself is also discharged at the same end face as indicated by the line 15. The reactor 10 is disposed with a slope toward the discharge side 10'. The flow relationships are selected such that the hot meal is brought far into the inside of the reactor 10 with the flame 110, precipitates there with an appropriate proportioning of the gas velocity, and agglomerates in the floor region in the product bed 111. It is discharged into the cooler as clinker by means of the line 15 in countercurrent flow to the flame 110. In the event of a concentration of harmful substances, at least a part of the gas containing such substances can be eliminated through a bypass 18. This is possible because only about 7 to 10% of the fuel required overall for the burning process is now burned in the clinker reactor 10 and the gas thereby arising likewise makes up only a small portion in comparison to the overall volume of exhaust gas.

With the installation shown in FIG. 8, the calciner 5, 51 is designed for the throughput of a relatively large amount of base material lower in melt phases and is equipped with two fuel introduction means 6 and 61. The calciner 5 is followed by a superheating and separating cyclone 52". The latter is supplied with hot gas from the calciner 5, its temperature having been raised above the calcining temperature of approximately 900° C. by a feeding fuel at the inlet 61. Hot gas in the conduit 11 is at approximately 1400° C. from the clinker reactor 10 and is supplied to the superheating cyclone 52".

The arrangement of the preheater line B and of the following calcining and melting cyclone 51', 55 in the installation of FIG. 8 is shown relatively smaller than the units in the preheater line A. This system therefore corresponds to a quantitative ratio wherein base materials higher in melt phases are present in lower amounts than base materials lower in melt phases. Such quantitative ratios can exist, for example, when one of the base materials contains one component nearly pure in a relatively high concentration and the other base material contains portions of several components that are mineralogically difficult to separate. The operating mode of the clinker reactor 10 in FIG. 8, however, corresponds to the illustration in FIG. 4b.

Figure 9:
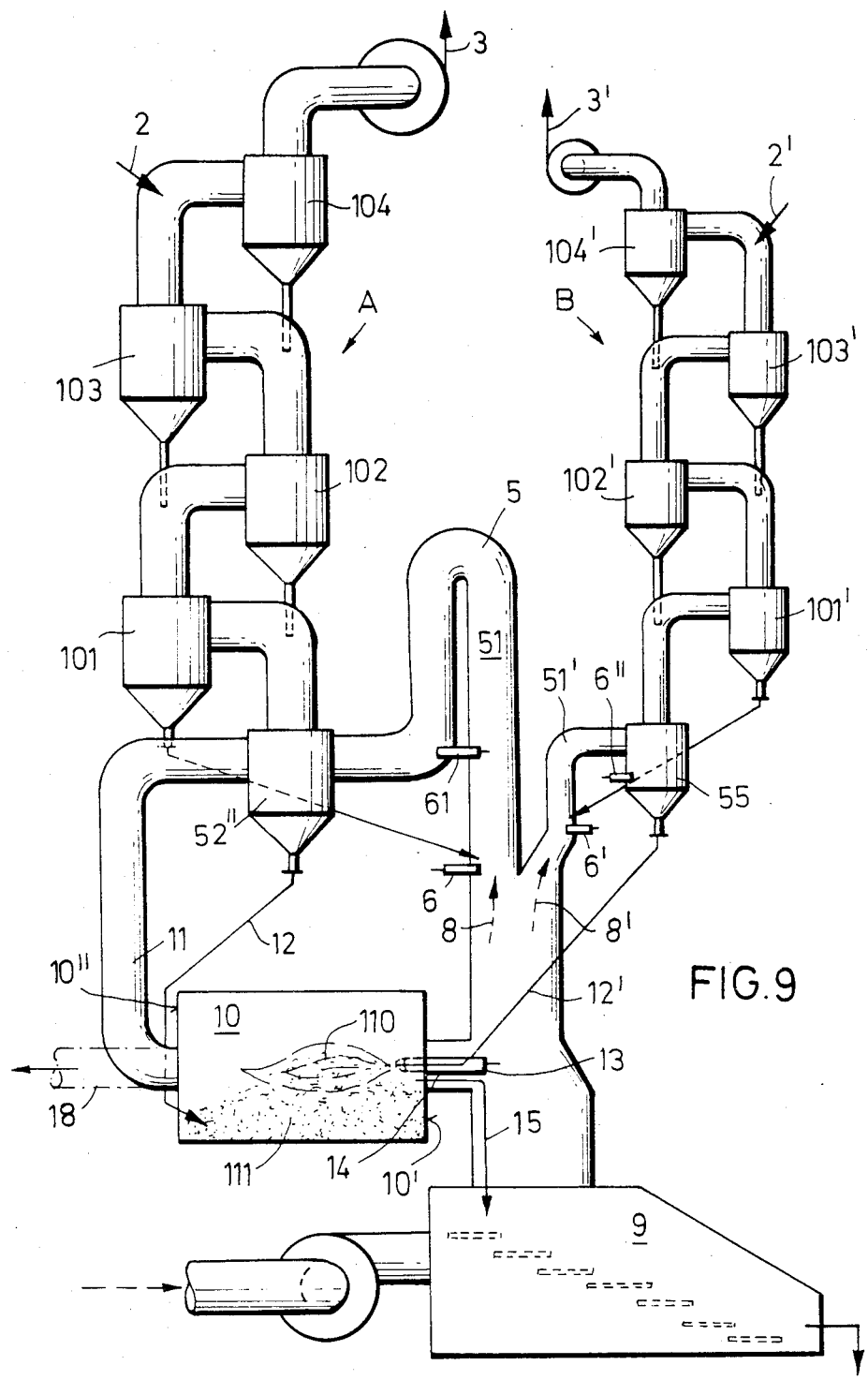

The installation according to FIG. 9 differs from that of FIG. 8 only in terms of the operating mode of the clinker reactor 10. FIG. 9 corresponds to an operating mode according to FIG. 4d whereby melt from a conduit 12', fuel at an inlet 13 and secondary air at an inlet 14 are introduced from the right-hand side 10' and hot meal from a conduit 12 is introduced into the product bed area 11 from the opposite side 10" in countercurrent flow thereto. The hot meal 12 is homogeneously mixed in the product bed 111 with the melt and is atomized in the flame 110 so that it is finish-burned into clinker. The installations according to FIGS. 8 and 9 are substantially identical in relation to the remaining structural features.

The differences and explanations of the system according to FIGS. 5 through 9 show that many system variations are possible, in particular, the preheater lines with the units for calcining, superheating, melting and clinker burning differing in size, design, and allocation depending upon the ratio of the quantitative streams of base materials.

Figure 10:
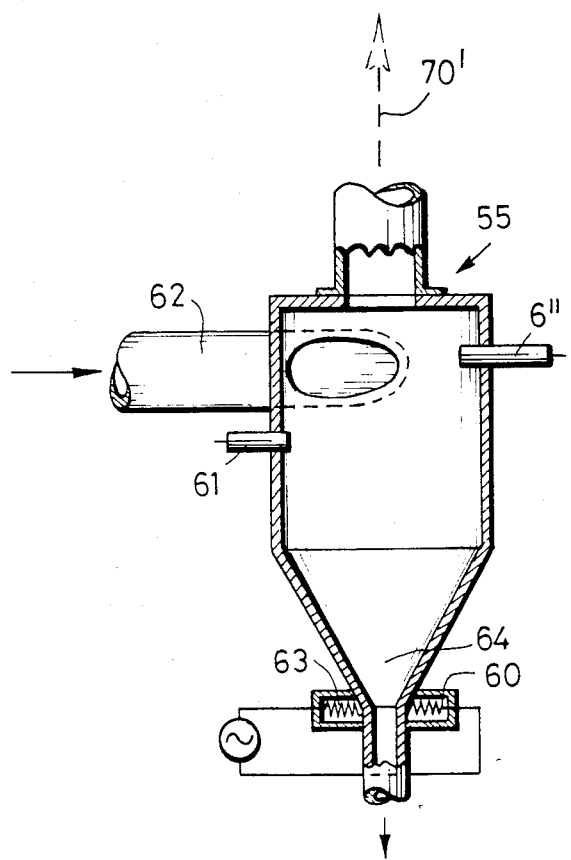
FIG. 10 is a view partially in elevation and partially in cross section of a melting cyclone having a means for superheating the melt.

It is essential to the present invention that the component carriers in the base materials are properly mixed and pretreated to produce a molten product stream which is mixed with a thermally pretreated, mealy product in the clinker reactor to produce extensive relief of the clinker-maturing stage of calcining and heating processes. The rapid burning of the base material lower in melt phases can occur in stationary units between 850 and 1250° C. One of these units is illustrated as a melting cyclone 55 according to FIG. 10. This structure includes means for introducing thermal energy at three levels 6", 60, and 61. The fine grained solid is introduced with a gas stream of hot carrier and combustion air through an inlet 62 and is melted upon the addition of fuel at the fuel inlet 6" and 61. Electrical energy such as an inductive heating means 63 can be employed in the area of the cyclone tip 64 for superheating the molten product stream.

The structure of the cyclone 55 is shown only by way of example. The structure can be designed, for example, as a flash smelter or in any other suitable means in which the fine grained material is melted in suspension in a flame.

It should be evident that various modifications can be made to the described embodiments without departing from the scope of the present invention.

We claim as our invention:

1. A method for burning cement clinker from two differing base materials, one base material having a relatively high proportion of components forming melt phases at a predetermined temperature and the other of said base materials having a relatively slight proportion of components forming melt phases at said predetermined temperature, which comprises:

separately thermally pretreating each of said base materials, at least partially melting said base material having a relatively high proportion of components forming melt phases, passing the at least partially molten material together with solid particles of the thermally pretreated base material having a relatively slight proportion of components forming melt phases into a clinker reactor, and forming cement clinker from the resulting mixture in said reactor.

2. A method according to claim 1 wherein said base material having a relatively slight proportion of components forming melt phases is at least partially calcined before its introduction into said clinker reactor.

3. A method according to claim 1 in which said cement clinker is formed under conditions of intense agitation.

4. A method according to claim 1 in which the differing base materials are simultaneously introduced into said clinker reactor.

5. A method according to claim 4 in which said differing base materials are introduced as a mixture through a flame in said clinker reactor.

6. A method according to claim 1 in which:
said differing base materials are provided in amounts dependent upon the relative amounts of components forming melt phases,
said base materials are each thermally pretreated at temperatures between 800 and 1250° C. and introduced into said clinker reactor at such temperature.

7. A method according to claim 1 wherein:
at least 30 weight % of the base material having a relatively high proportion of components forming melt phases is converted into the molten state so that it has the flow properties of a melt.

8. A method according to claim 1 wherein:
said base material is rendered at least partially molten by suspension of the material particles in a flame.

9. A method according to claim 1 in which the at least partially molten stream is subsequently superheated.

10. A method according to claim 1 in which:
said base material having a relatively high proportion of components forming melt phases is a blast furnace slag.

11. A method according to claim 1 in which the base material having a relatively high proportion of components forming melt phases is combined with additional lime to a CaO content in the stability range of $Ca_2SiO_4$ (belite).

12. A method according to claim 1 wherein the base material having a relatively high proportion of components forming melt phases has an $Al_2O_3/Fe_2O_3$ mass ratio of less than 1.7.

13. A method according to claim 1 in which said thermal pretreatment is carried out in stationary units.

14. A method according to claim 1 wherein said clinker reactor is a rotary tubular kiln.

15. An apparatus for burning cement clinker which comprises:
a first preheating unit,
means for introducing a first base material having a relatively high proportion of components forming melt phases at a predetermined temperature into said first preheating unit,
said first preheating unit including a melting reactor,
a second preheating unit,
means for introducing a second base material having a relatively low proportion of components forming melt phases at said predetermined temperature into said second preheating unit, and
a clinker reactor, said clinker reactor having a feed means for introducing an at least partially molten product into said clinker reactor from said first preheating unit and a feed means for introducing a mealy, preheated product from said second preheating unit.

16. An apparatus according to claim 15 wherein: said clinker reactor is a melting cyclone.

17. An apparatus according to claim 16 which includes:
a calcining stage preceding said melting cyclone.

18. An apparatus according to claim 15 wherein:
said first and second preheating units have separate exhaust gas systems and a common exhaust cleaning means.

19. An apparatus according to claim 15 wherein:
said second preheating unit includes a calciner.

20. An apparatus according to claim 15 wherein:
said clinker reactor is a rotary kiln.

21. An apparatus according to claim 20 which includes:
means for introducing secondary air, fuel, molten first base material, and solid second base material into one end of said kiln, and
means for discharging exhaust gas and clinker from the other end of said kiln.

22. An apparatus according to claim 20 which includes:
means for introducing molten first base material and solid second base material into one end of said kiln,
means for discharging exhaust gas from said one end of said kiln,
means for introducing secondary air and fuel into the other end of said kiln, and
means for discharging clinker from said other end of said kiln.

23. An apparatus according to claim 20 which includes:
means for discharging exhaust gas at one end of said kiln,
means for introducing molten first base material, solid second base material, fuel and secondary air into the opposite end of said kiln, and
means for discharging clinker from said opposite end of said kiln.

24. An apparatus according to claim 20 which includes:
means for discharging exhaust gas at one end of said kiln,
means for introducing molten first base material, solid second base material, fuel, and secondary air at the opposite end of said kiln, and
means for discharging clinker at the opposite end of said kiln.

25. An apparatus according to claim 19 which includes a heating unit disposed between said calciner and said clinker reactor.

* * * * *